US010680442B2

(12) United States Patent
Roessler et al.

(10) Patent No.: US 10,680,442 B2
(45) Date of Patent: Jun. 9, 2020

(54) METHOD AND SYSTEM FOR PROVIDING ENERGY SERVICES

(71) Applicant: Alcatel Lucent, Boulogne Billancourt (FR)

(72) Inventors: Horst Roessler, Stuttgart (DE); Hans-Peter Hirler, Stuttgart (DE); Gert Eilenberger, Stuttgart (DE)

(73) Assignee: ALCATEL LUCENT, Boulogne-Billancourt (FR)

( * ) Notice: Subject to any disclaimer, the term of this patent is extended or adjusted under 35 U.S.C. 154(b) by 34 days.

(21) Appl. No.: 15/547,262

(22) PCT Filed: Jan. 26, 2016

(86) PCT No.: PCT/EP2016/051511
§ 371 (c)(1),
(2) Date: Jul. 28, 2017

(87) PCT Pub. No.: WO2016/128210
PCT Pub. Date: Aug. 18, 2016

(65) Prior Publication Data
US 2018/0054062 A1    Feb. 22, 2018

(30) Foreign Application Priority Data

Feb. 11, 2015   (EP) .................................. 15290045

(51) Int. Cl.
*H02J 3/38*      (2006.01)
*H02J 13/00*     (2006.01)
(Continued)

(52) U.S. Cl.
CPC ............. *H02J 3/381* (2013.01); *G05B 15/02* (2013.01); *G06Q 50/06* (2013.01); *H02J 3/38* (2013.01);
(Continued)

(58) Field of Classification Search
CPC .......... H02J 3/381; H02J 13/0006; H02J 3/38; H02J 2003/007; G05B 15/02;
(Continued)

(56) References Cited

U.S. PATENT DOCUMENTS

| 8,401,709 B2 | 3/2013 | Cherian et al. |
| 2008/0040479 A1* | 2/2008 | Bridge ...................... B60L 3/12 709/224 |

(Continued)

FOREIGN PATENT DOCUMENTS

| JP | 2012093905 A | 5/2012 |
| JP | 2013510545 | 3/2013 |
| JP | 2014217186 A | 11/2014 |

OTHER PUBLICATIONS

Elias Molina, Eduardo Jacob, Jon Matias, Naiara Moreira, and Armando Astarloa, "Using Software Defined Networking to manage and control IEC 61850-based systems," Computers & Electrical Engineering, vol. 43, 2015, pp. 142-154, available online Nov. 13, 2014 (Year: 2014).*

(Continued)

*Primary Examiner* — Christopher E. Everett
(74) *Attorney, Agent, or Firm* — McCracken & Gillen LLC

(57) ABSTRACT

The present document relates to a system for providing energy services in an energy grid using a cloud environment. The system comprises at least one control entity adapted to receive information from at least one of a plurality of energy grid elements and to operate the energy grid elements based on operational policies. One or more control interfaces are coupled with the energy grid elements. The control interfaces are adapted to transmit information provided by an energy grid element to a control entity and/or the control interfaces are adapted to receive information from the control entity to operate the energy grid element based on the (Continued)

information. The at least one control entity comprises a plurality of software modules which are hosted in the cloud environment, and the operational policies are stored in storage entities of the cloud environment to operate the energy grid elements according to the operational policies.

20 Claims, 5 Drawing Sheets

(51) Int. Cl.
 *G06Q 50/06* (2012.01)
 *G05B 15/02* (2006.01)
 *G06Q 10/06* (2012.01)
(52) U.S. Cl.
 CPC ...... *H02J 13/0006* (2013.01); *G06Q 10/0631* (2013.01); *H02J 2203/20* (2020.01); *Y02B 70/3216* (2013.01); *Y02E 40/72* (2013.01); *Y02E 60/76* (2013.01); *Y04S 10/12* (2013.01); *Y04S 20/221* (2013.01); *Y04S 40/22* (2013.01)
(58) Field of Classification Search
 CPC ......... G06Q 50/06; Y02E 60/76; Y02E 40/72; Y04S 40/22; Y04S 10/12
 See application file for complete search history.

(56) References Cited

U.S. PATENT DOCUMENTS

| | | | | |
|---|---|---|---|---|
| 2009/0062970 A1* | 3/2009 | Forbes, Jr. | ............ | G01D 4/004 700/295 |
| 2009/0326726 A1* | 12/2009 | Ippolito | ............ | H02J 3/14 700/291 |
| 2010/0145544 A1* | 6/2010 | Forbes, Jr. | ............ | G06Q 10/00 700/295 |
| 2010/0235008 A1* | 9/2010 | Forbes, Jr. | ............ | G06Q 10/00 700/291 |
| 2010/0332373 A1 | 12/2010 | Crabtree et al. | | |
| 2011/0202192 A1* | 8/2011 | Kempton | ............ | G06Q 30/0601 700/291 |
| 2012/0226384 A1* | 9/2012 | Forbes, Jr. | ............ | G06Q 10/00 700/291 |
| 2012/0245753 A1* | 9/2012 | Forbes, Jr. | ............ | G06Q 10/00 700/295 |
| 2012/0253540 A1* | 10/2012 | Coyne | ............ | G06Q 10/00 700/297 |
| 2012/0310424 A1 | 12/2012 | Taft | | |
| 2013/0024306 A1* | 1/2013 | Shah | ............ | G06Q 20/32 705/17 |
| 2014/0039703 A1* | 2/2014 | Forbes, Jr. | ............ | G05B 19/02 700/286 |
| 2014/0351010 A1* | 11/2014 | Kong | ............ | G05F 1/66 705/7.29 |
| 2016/0092978 A1* | 3/2016 | Lian | ............ | G06Q 30/08 705/412 |
| 2016/0094032 A1* | 3/2016 | Vaudreuil | ............ | H02J 3/32 700/295 |

OTHER PUBLICATIONS

A. Cahn, J. Hoyos, M. Hulse and E. Keller, "Software-defined energy communication networks: From substation automation to future smart grids," 2013 IEEE International Conference on Smart Grid Communications (SmartGridComm), Vancouver, BC, 2013, pp. 558-563. (Year: 2013).*

T. Pfeiffenberger and J. L. Du, "Evaluation of software-defined networking for power systems," 2014 IEEE International Conference on Intelligent Energy and Power Systems (IEPS), Kiev, 2014, pp. 181-185. (Year: 2014).*

Office Action in related Korean Patent Appln. No. 2017-7022362, dated Jun. 28, 2019, 3 pages.

Office Action in related Japanese Application No. 2017-542150, dated Jun. 25, 2019, 5 pages.

Office Action in related Chinese Patent Appln. No. 201680009636X, dated Aug. 21, 2019, 10 pages.

* cited by examiner

METHOD AND SYSTEM FOR PROVIDING ENERGY SERVICES

TECHNICAL FIELD

The present document relates to the field of managing energy grids. In particular, the present document relates to a system and method for providing energy services based on a cloud environment infrastructure.

BACKGROUND

Due to the finite nature of fossil fuels and decreasing acceptance of nuclear power, the generation of energy, respectively, the demands to the energy grid fundamentally change. The change from fossil fuels and nuclear energy to renewable and CO2 neutral energy will result in a plethora of small and large, concentrated and decentralized solar, wind, hydro, geothermal etc. power sources to be connected to the energy grid.

Existing energy grids and their management are not designed to cope with
  the geographical mismatch between power sources and consumers;
  the dynamics of varying energy levels provided by renewable sources;
  the temporal mismatch between the consumers' demands and the offers by renewable sources.

In addition, due to decentralized power sources, the efficiency of the provision of energy can be dramatically increased if the energy generated at a certain location is consumed close to said location in order to avoid losses due to long-distance power transmission.

US Patent Application US 2010/0332373 A1 discloses a system and a method for participating in energy-related markets. A multidimensional energy decision system comprises a plurality of server systems, including at least a statistics server and an interface adapted to receive and send digital information from at least a client system. The multidimensional energy decision system is further adapted to optionally communicate with a digital exchange via a packet-based data network. The multidimensional energy decision system periodically optimizes operational parameters of client system for a specific time period and a specific energy asset from client system based on forecasted conditions.

Thus, there is a need to provide a method and system for orchestrating energy grid elements comprised within the energy grid in a flexible and efficient way in order to guarantee a reliable supply of energy and meet the demands of power suppliers and other players in the energy sector.

SUMMARY

According to a first aspect, a system for providing energy services in an energy grid is disclosed. The system uses a cloud environment comprising a distributed server architecture for processing computational tasks and a plurality of storage entities for storing information. The cloud environment may comprise a plurality of servers, storage entities and other hardware components which are interconnected by a communication network in order to exchange information. The cloud environment provides a platform for providing virtual services, e.g. virtual servers for processing computational tasks.

The system may comprise at least one control entity being adapted to receive information from at least one of a plurality of energy grid elements and operate the energy grid elements based on operational policies.

Furthermore, the system may comprise one or more control interfaces being coupled with the energy grid elements, the control interfaces being adapted to transmit information provided by an energy grid element to the control entity and/or the control interfaces being adapted to receive information from the control entity in order to operate the energy grid element based on said information. The control interface may provide a generalized control interface describing the functionality of the underlying energy grid elements. In other words, the control interface provides a decoupling between device-specific hardware/parameter and generalized information provided to the control entity.

The at least one control entity may comprise a plurality of software modules which are hosted in said cloud environment. So, the control entity is an aggregation of a plurality of pieces of software which can be hosted on a single server or on a plurality of different, spatially distributed servers. The operational policies are stored in storage entities of said cloud environment, wherein the control entity is able to access the operational policies in order to operate the energy grid elements according to said operational policies.

The proposed system is advantageous because an efficient operation of a plurality of energy grid elements comprised within the energy grid based on operational policies is possible paired with scalability, reliability, availability, security and robustness provided by the cloud environment.

According to embodiments, the control interface provides a generalized interface adapted to describe the functionality of an energy grid element based on a set of parameters. For example, a power generating entity can be described by generalized parameters "peak power", "average power", "minimum power", "efficiency", "location" etc. By means of said set of parameter, the control entity is able to assess the energy grid element and use the energy grid element according to operational requirements.

According to embodiments, the energy grid elements may be grouped according to energy grid element types and the set of parameters is chosen according to said energy grid element type in order to characterize specific properties of said type of energy grid elements. For example, the types "power generators", "power consumer", "energy storage" etc. may be defined and the set of parameter is chosen such that the properties of the respective type of energy grid element are described in a generalized way.

According to embodiments, the control entity may be adapted to receive properties and/or status information of the energy grid elements in order to orchestrate the energy grid elements according to one or more operational properties. For example, there is a real-time monitoring of operational parameters, e.g. load of an energy storage, actually generated power of a power generator etc. In addition, the control entity may receive information from different consumers regarding their present demand of the energy. Based on the actual supply and demand of energy, the control entity may distribute the energy such that the requirements laid down in the operational policies (e.g. receive energy at lowest costs, provide energy at prices above a certain threshold etc.) are fulfilled. According to embodiments, the cloud environment may provide a user interface, the user interface enabling a user to define a user-related operational policy in order to define the usage of resources of the energy grid in a customized way. For example, the user may store an application on a computing device, said application providing a graphical user interface for entering one or more user-specific parameters, said parameters defining a user-related operational policy for controlling resources of the energy grid. In addition, the cloud may host user related applications which are adapted to process user-defined commercial models or use cases based on the provided operational properties.

According to embodiments, the settings provided via the user interface may be stored in user-related storage areas of the cloud environment. Similarly, applications adapted to process user-defined commercial models or use cases may be stored in said user-related storage areas. So, a certain user is able to deposit a set of rules (operational policies) in the cloud environment in order to enable the control entity to orchestrate the energy grid elements according to said rules.

According to embodiments, the operational policies may include rules for controlling the energy input in or energy output out of one or more energy grid elements. For example, the owner of a battery pack (energy grid element of type "energy storage") may provide an operational policy defining that energy is stored in the battery pack when energy costs are lower than a first threshold and energy is provided from the battery pack to a consumer when energy costs are above a second threshold. Thereby, the system is able to fulfil user requirements depending on certain parameter derived from the energy grid or parameters of players within the energy grid.

According to embodiments, the control entity may be adapted to dynamically aggregate multiple energy grid elements in order to build at least one virtual energy sub-grid within the energy grid. For example, an energy supplier may be associated with a plurality of energy grid elements and may group said energy grid elements into one or more virtual energy sub-grids. Said virtual energy sub-grids may be independent from each other and may be controlled separately, i.e. the virtual energy sub-grids are isolated with respect to control purposes but included in one and the same energy grid.

According to embodiments, the control entity and the energy grid elements may be coupled via a communication network connection, specifically a virtual private network (VPN) connection. For example, the control entity is adapted to include energy grid elements of a virtual energy sub-grid in a communication network and enable a communication of said energy grid elements via said communication network by choosing the respective settings. For example, the control entity is adapted to configure a VPN-connection between the energy grid elements in order to enable a secure communication between the energy grid elements of a virtual energy sub-grid.

According to embodiments, the cloud environment may be adapted to provide one or more virtual power plant applications (VPP) in order to control at least one virtual energy sub-grid. So, each virtual energy sub-grid may be associated with a certain VPP. The VPP may be an application or a set of multiple applications which are also hosted in the cloud environment for executing said applications.

According to embodiments, the control entity may be coupled with a cloud environment control entity for exchange of information. Said cloud environment control entity may be, for example, a software-defined network (SDN) controller being adapted to control network operations and/or scheduling/execution of processes within a cloud environment. By means of coupling the control entity and the cloud environment control entity it is possible to increase the cost-efficiency of the cloud environment because the processes are scheduled at servers which can be supplied with lowest energy costs. On the other hand, the control entity can be aware of processes to be scheduled and try to effectively use available energy resources at locations at which processes are actually executed in the cloud environment.

According to embodiments, the distribution of computational tasks within the cloud environment may be controlled based on information provided by the control entity. By upper-mentioned exchange of information between the control entity and the cloud environment control entity, the computational tasks may be scheduled within the cloud environment on servers which are close to energy grid elements providing low-cost energy. Thereby, the energy costs of the cloud environment are significantly decreased.

According to embodiments, the control entity may be adapted to dynamically add an energy grid element to a virtual energy sub-grid and/or remove an energy grid element from a virtual energy sub-grid. The control entity comprises means for including a new energy grid element into an existing virtual energy sub-grid by requesting parameters of the energy grid element, integrating the energy grid element into the virtual energy sub-grid according to said parameters and realize a communication between the energy grid element and the control entity managing the virtual energy sub-grid. Preferably, the control entity may be adapted to select a certain virtual energy sub-grid out of a plurality of virtual energy sub-grids based on the requested set of parameters in order to integrate the energy grid element into a virtual energy sub-grid which matches to the properties of said energy grid element.

According to embodiments, the control entity may comprise means for dynamically including an energy grid element into the communication network in order to enable a communication between the energy grid element and the control entity. Preferably, the control entity may be adapted to include the energy grid element into VPN-network of the respective virtual energy sub-grid in order to enable a reliable and secure communication between the energy grid element and the control entity.

According to a further aspect, a method for providing energy services in an energy grid using a cloud environment comprising a distributed server architecture for processing computational tasks and a plurality of storage entities for storing information is disclosed. The energy grid comprises a plurality of energy grid elements, the energy grid elements being coupled with a control entity by means of one or more control interfaces. The method comprises the steps of:
  instantiating at least one control entity comprising a plurality of software modules in said cloud environment by hosting the software modules on the distributed server architecture;
  storing operational policies in storage entities of said cloud environment; and
  exchanging information between a control entity and energy grid elements via the one or more control interfaces in order to operate the energy grid elements according to the stored operational policies.

It will be further understood that the term "energy grid element", when used in this specification, specifies any element within the energy grid which is used for supplying, transferring or storing energy, specifically electrical energy. Energy grid elements may be, for example, power generators, e.g. wind power plants, photovoltaic systems, fossil fuel power plants, power consumers, e.g. factories, E-cars or power storing facilities, e.g. battery packs or pumped storage power plants.

It will be further understood that the term "cloud environment", when used in this specification, specifies a computing environment comprising a distributed server architecture comprising a plurality of servers. Said servers may be spatially distributed (regional or national). In addition, a cloud environment may comprise multiple storage entities for storing information.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner. Further, if not explicitly indicated otherwise, embodiments of the invention can be freely combined with each other.

BRIEF DESCRIPTION OF DRAWINGS

The invention is explained below in an exemplary manner with reference to the accompanying drawings, wherein.

DETAILED DESCRIPTION

The integration and control of Distributed Energy Resources (DER) into communication technology (ICT) is an important demand for future energy architectures. Current power systems are not enough utilized in interaction of their components like DER. One objective of this document is the aggregation and integration of DER into Virtual Power Plants (VPP) and controlling them with Software Defined Networking (SDN).

This document describes the convergence between Software Defined Networking (SDN) and Virtual Power Plant (VPP) in which the Distributed Energy Resources (DER) are aggregated. Hereby, a link between telecommunication technologies (ICT) and the smart power grid is generated and control can be embodied by the SDN Controller. Thus, it is not necessary to develop an extra control-platform. No extra developed control platform is needed. This function is adopted through the link between VPP and the SDN controller. The OpenFlow approach allows transporting any type of common datastream from the SDN side and the VPP/DER side through the network.

Aggregation and control of DERs is an attractive research topic. The SDN technology providing scalable and efficient networks may constitute a communication platform for controlling DERs comprising networked IECs and IDEs connected via Ethernet. Network resources supporting DER communication may be allocated on-demand when DER's (IEDs) join or leave a VPP dynamically. A newly joined DER may be dispatched to the virtual network of the suitable VPP. The network management complexity can be handled by software services based on SDN components (Apps).

Figure 1:
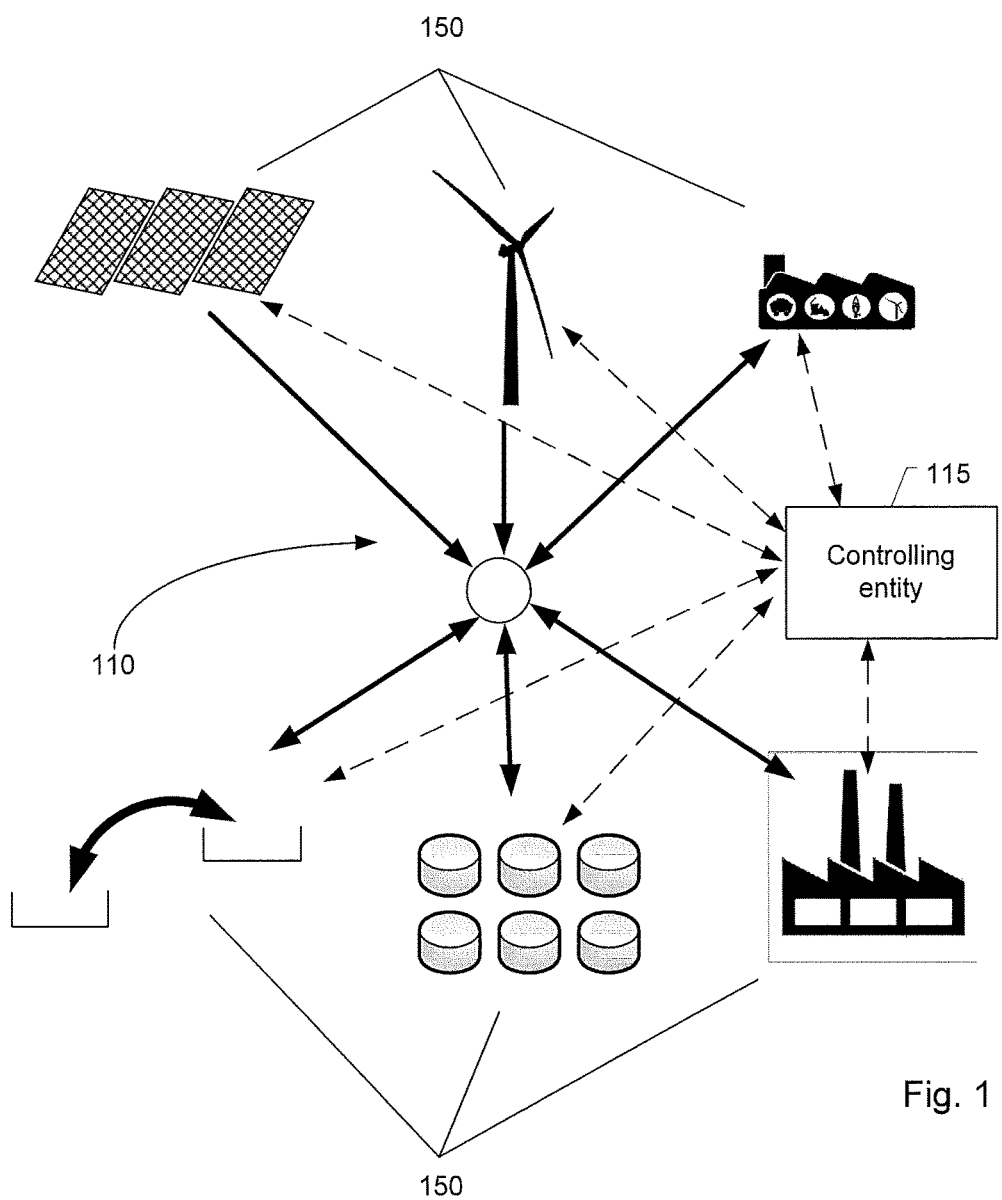
FIG. 1 illustrates an example schematic representation of an energy grid comprising a plurality of energy grid entities.

FIG. 1 schematically illustrates an energy grid 110 comprising a plurality of energy grid elements 150. The energy grid 110 may comprise a plurality of electric power lines. The electric power lines are adapted to transmit electric power between energy grid elements 150 which may generate electric power and energy grid elements 150 which may consume electric power. According to the schematic diagram of FIG. 1, the upper energy grid elements 150 are generating electric power. Such electric power generating energy grid elements 150 may be, for example, power plants (nuclear power plants, power plants using fossil fuels) or regenerative energy sources, e.g. photovoltaic-plants, wind power plants, geothermal power plants, combined heat and power units etc. Energy grid elements 150 which are consuming electric energy (illustrated by the lower energy grid elements 150 in FIG. 1) may be, for example, factories, households, battery packs, electric cars, or pumped-storage power plants. At least a part of said energy grid elements 150 may be operated by one or more energy suppliers which generate power by means of the electric power generating energy grid elements 150 and provide said generated energy to energy consuming energy grid elements 150. In order to control the energy grid elements 150, specifically the amount of energy generated by the energy grid elements 150 according to the energy demand of the energy consuming energy grid elements 150, a control unit 115 may be provided. Said control unit 115 may be included in a central control station, may receive information from the energy grid elements 150 and provide control information to the energy grid elements 150 in order to control the generation of energy according to present and/or expected energy demand.

Referring again to FIG. 1, this figure sketches a SDN controller architecture comprising network oriented services (southbound interfaces) such as topology and route computation and DER/VPP specific service components (northbound interfaces) such as real-time monitoring and aggregation control. The RESTful northbound interface provides a programming language independent service (application) interface to a potential VPP control-center. The physical connection from the network element (e.g. a switch) to the controller may convey the OSPF protocol and the IEC 61850 protocol. The OSPF protocol supported by an OSPF client at the network element provides mainly modification operations of the forwarding tables. The IEC 61850 protocols supported by a 61850 compliant client at the IED provide 61850 specific configuration (SCL: substation configuration language) and operations towards I/O e.g. relay.

Figure 2:
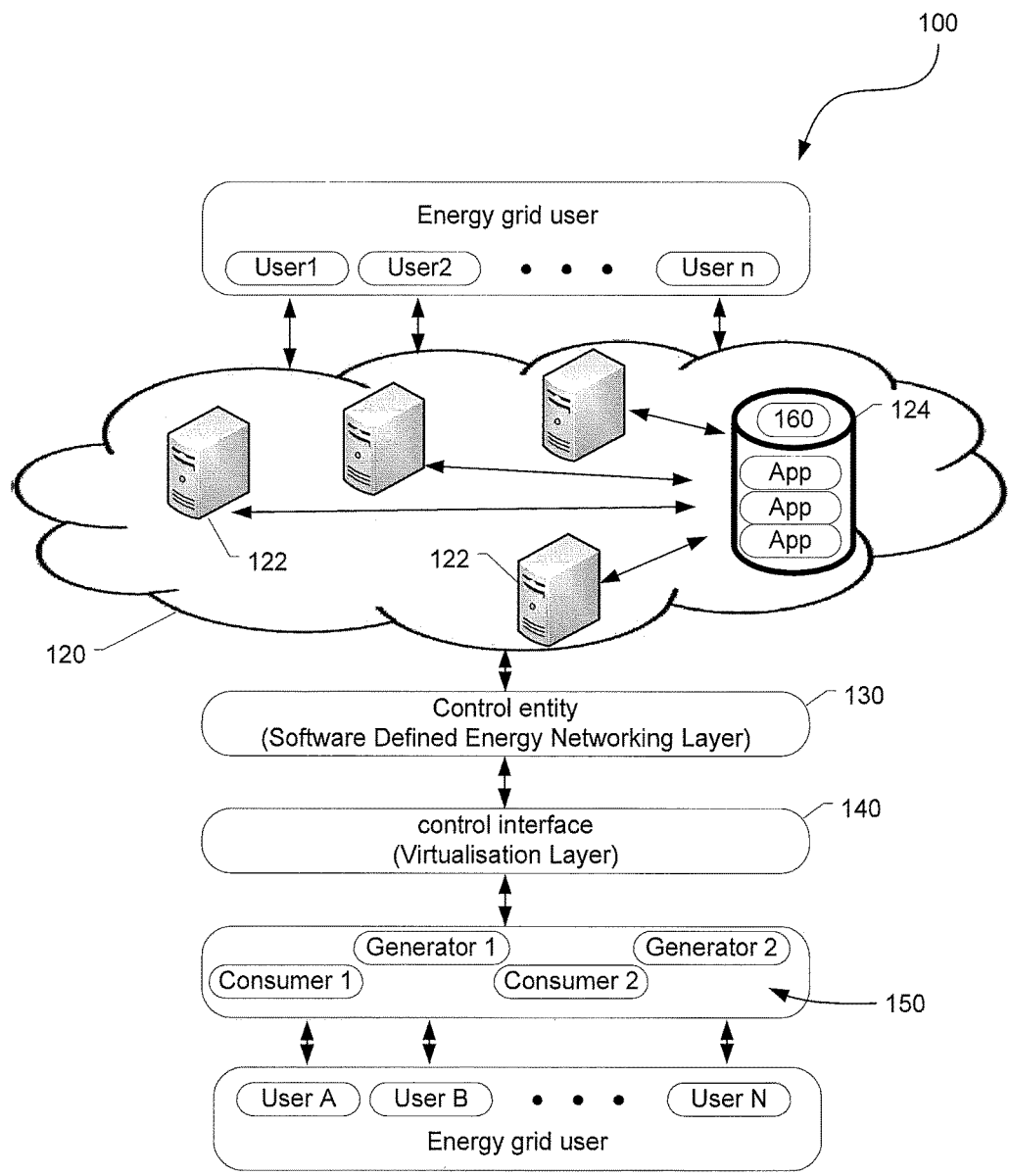
FIG. 2 illustrates an example schematic representation of system for providing energy services using cloud architecture.

FIG. 2 shows an example embodiment of a system 100 for providing energy services within an energy grid 110 using a cloud environment 120. The cloud environment 120 comprises a plurality of servers 122 which may be spatially distributed. In other words, the cloud environment 120 comprises a distributed server architecture. In addition, the cloud environment 120 may comprise a plurality of storage entities 124 for storing information or data within the cloud environment 120.

The system 100 further comprises one or more control entities 130. A control entity 130 is a software-based control unit comprising a plurality of software modules. Said control entity 130 may be in the following referred to as software-defined Energy Network (SDEN) controller. The control entities 130 may be included in a software defined energy networking layer. Each control entity 130 may be adapted to control a plurality of energy grid elements 150 included in the energy grid 110. As already mentioned before, the energy grid elements 150 may be energy generating/providing elements, energy consuming elements or even energy elements 150 which can in a first period of time receive energy, store the energy and provide said energy in a second period of time (e.g. pumped-storage power plants, battery packs etc.). The energy grid elements 150 may be coupled with the energy grid 110 in order to provide electric energy to or receive electric energy from other elements included in the energy grid 110.

Said energy grid elements 150 may be associated with one or more energy grid users (user A, user B, . . . user N). For example, a first energy grid user may operate photovoltaic modules at a first geographic location, a second energy grid user may operate a wind power plant at a second geographic location and third energy grid user is operating biogas plant at a third geographic location.

The energy grid elements 150 may be grouped into energy grid element types based on their specific behavior. For example, energy grid elements 150 may be grouped into the energy grid element types "energy storage", "energy generator", "energy consumer" etc.

In order to be able to control the energy grid elements 150 by means of the control entity 130, at least one control interface 140 is provided. The control interface may be included in a virtualization layer, said virtualization layer providing a generalized interface between the energy grid elements 150 and the control entity 130. By means of the control interface 140, functionalities of the energy grid elements 150 may be abstracted, i.e. the functionality of an energy grid element 150 is defined independent of the energy grid element hardware and its specific properties. For example, the energy grid element type "energy storage" may be described by generalized control interface parameters "capacity", "minimum and maximum usable energy content", "minimum and maximum loading capacity", "state of charge", "level of efficiency", "location" etc.

The virtualization layer may be formed by a plurality of control interfaces 140 wherein each control interface 140 is associated with a certain energy grid element 150. In other words, one or more energy grid elements 150 (depending on their spatial distribution) may be coupled with the control entity 130 by means of a control interface 140. The control interface 140 may provide means for exchanging information between the control entity 130 and the energy grid elements 150. For example, during an initialization routine, the control interface 140 may provide basic parameters of the respective energy grid element 150 towards the control entity 130 in order to provide time-invariant information to the control entity 130 (type of energy grid element, capacity, location, efficiency etc.). During the operation of the energy grid element 150, further information (specifically time-variant information) may be provided to the control entity 130 (e.g. actually generated electric power, state of charge etc.). Based on said received information, the control entity 130 may be adapted to control the energy grid elements 150 based on operational policies in order to achieve a certain objective. In addition, the control entity 130 may control switching elements included in the energy grid 110 in order to achieve a desired routing of energy from energy generating energy grid elements 150 to energy consuming energy grid elements 150.

As already mentioned above, the control entity 130 is formed by a plurality of software modules which are hosted on one or more servers 122 of the cloud environment 120. Specifically, the control entity 130 may be implemented by one or more virtual servers. Due to the implementation in the cloud environment 120, the control entity 130 is scalable depending on the number of energy grid elements 150 to be controlled. In other words, due to the software-based implementation of the control entity 150 and the ability to distribute the computational tasks of the control entity 130 onto a plurality of servers 122, the control entity 130 is scalable on demand.

Each user of energy services provided by the system 100 may intend to achieve certain objectives. For example, the owner of a photovoltaic system may intend to achieve the best price for the generated electric power. However, the owner of an electric car may intend to receive electric energy with the lowest price in a certain period of time. In order to be able to meet said requirements, the users may be able to implement certain operational policies 160, said operational policies 160 indicating rules for operating one or more energy grid elements 150.

In order to create and administrate said operational policies 160, the users may be able to use applications (App). Said Apps may trigger processes within the cloud environment 120 in order to meet the operational policies 160. For example, said Apps may reflect certain user-specific business models, certain user-specific scenarios and/or certain user-specific action patterns thereby enabling the users to use the energy resources in a user-friendly way, for example with a graphical user interface. Said Apps may provide means for checking the user authorization, means for accounting costs and revenues and/or may provide preconfigured functional packages or functional packages which are tailored for the specific use case.

The control entity 130 may be adapted to manage all energy grid elements 150. For example, the control entity 130 may be coupled with a database, said database including information of the energy grid elements 150 included in the energy grid 110. For example, the database includes information regarding the actually active/passive energy grid elements 150, their operating parameters, the location of the respective energy grid element 150 and information regarding the integration of the respective energy grid element 150 into the energy grid (i.e., details regarding the coupling of the energy grid element 150 with the energy grid 110).

The control entity 130 may be further adapted to build virtual energy sub-grids within the energy grid 110. Said virtual energy sub-grids may comprise subset of energy grid elements 150 included within the energy grid 110. For example, a first group of energy grid elements 150 may be included in a first virtual energy sub-grid and a second distinct group of energy grid elements 150 may be included in a second virtual energy sub-grid. Thereby, it is possible, that a power supplier may group energy grid elements 150. Said group may be administrated by a software application, said software application in the following referred to as virtual power plant (VPP). Based on the cloud environment 120, it is possible to operate multiple virtual energy sub-grids in parallel, wherein each virtual energy sub-grid is operated by a virtual power plant. Said multiple virtual energy sub-grids are independent and separated from each other but driven on the same hardware platform, namely the hardware of the cloud environment 120.

In order to be able to exchange information between the control entity 130 and the energy grid elements 150, the control entity 130 and the control interfaces 140 associated with the energy grid elements 150 are coupled via a communication link. The communication link may be realized by a common communication network connection provided by a telecommunication provider. For example, the communication link may be a TCP/IP communication link or an Ethernet link (e.g. for providing a time-efficient transfer of high frequency monitoring samples). The energy grid elements 150 may be coupled with the control interface 140 via standardized protocols, e.g. Open Flow-protocol, IEC61850-protocol, Simple Network Management Protocol (SNMP) or NETCONF protocol. Also other standardized protocols may be possible.

Based on the current information received from the energy grid elements 150 (time-dependent generated electric power, state of charge etc.) and the operational policies 160 implemented by one or more users, the control entity 130 is able to orchestrate the energy grid elements 150 according to the operational policies. In other words, based on the cloud environment 120 and a wide-area (regional, national, international) generalized access to the energy grid entities (based on the generalized interface provided by the virtualization layer including the control interface 140) a flexible, real-time orchestration of energy grid resources base on operational policies is possible.

Figure 3:
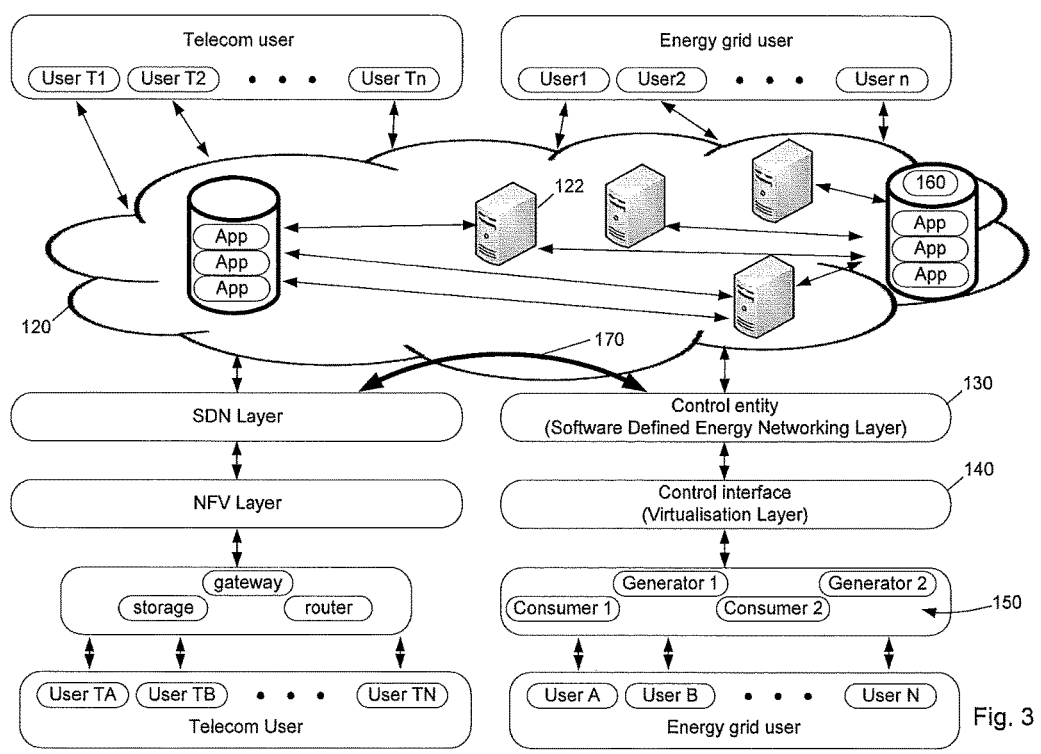
FIG. 3 illustrates an example schematic representation of system for providing energy services using cloud architecture being coupled with a software-defined network controller.

FIG. 3 shows a specific embodiment of the system 100 according to FIG. 2. As already mentioned before, the system 100 is using a cloud infrastructure and a communication network infrastructure for orchestrating the energy grid resources. This is in analogy with the software defined networking (SDN) approach intending a decoupling of network control from hardware by outsourcing the network control tasks to a software application called SDN controller (in general cloud environment control entity). The left portion of FIG. 3 shows an example cloud-based SDN-architecture (IT-domain) next to the cloud-based system 100 for orchestrating an energy grid 110 (energy domain). The energy grid users in the energy domain correspond to the telecom users in the IT-domain. The virtualization layer in the energy domain corresponds to the Network Function Virtualization (NFV) layer in the IT-domain. Finally, the software defined Energy Networking layer in the energy domain corresponds to the SDN-layer in the IT-domain. Due to the usage of the same hardware resources for processing the Software-Defined Networking tasks (network control tasks) and the Software-Defined Energy Networking tasks (energy network control tasks) it might be advantageous to share information between the control entity 130 (implementing the Software-Defined Energy Networking functionality) and the SDN controller in order to lower the energy costs caused by software defined networking processes and in order to achieve an effective usage of energy resources of the energy grid 110. In other words, the SDN controller and the control entity 130 may share information regarding the cloud environment usage, respectively the energy resources provided in the energy grid in order to improve the usage of regionally available energy and/or in order to supply the cloud environment infrastructure with low-cost electric energy.

The SDN controller and the control entity 130 may be coupled via a data link 170 in order to be able to exchange upper-mentioned information. Preferably, also at least some servers 122 included in the cloud environment are registered at the control entity 130 as energy grid elements 150. Thereby, the actual energy consumption of the servers 122 is monitored by the control entity 130 and taken into account for fulfilling operational policies 160. Due to sharing information between the SDN controller and the control entity 130, the SDN controller is able to distribute computational tasks within the cloud environment 120 according to the energy resources available in the energy grid (e.g. host certain applications on a server located in a region where low-cost energy is available). On the other hand, the control entity 130 of the energy domain is able to use information of the SDN controller in order to consider the electric energy consumption of the cloud environment for fulfilling operational policies of the energy grid users.

Figure 4:
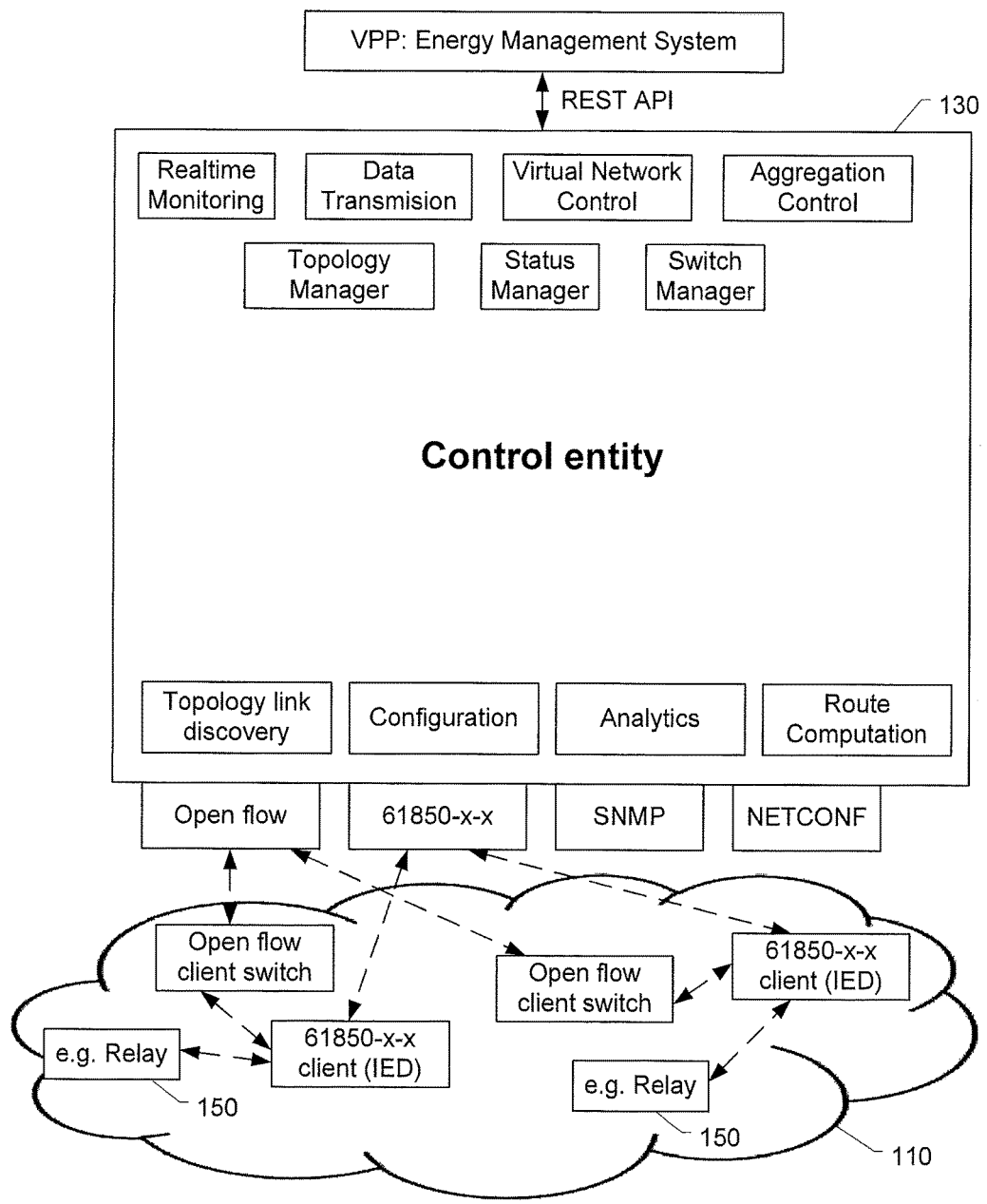
FIG. 4 illustrates an example schematic block diagram of an control entity being adapted to control energy services within an energy grid.

FIG. 4 shows an example embodiment of a control entity 130 being adapted to control energy resources provided in an energy grid 110. Preferably, the control entity 130 integrates communication network and energy grid functions in order to be able to manage the data communication between the energy grid elements 150 and the control entity 130 as well as energy functionality for fulfilling the energy specific operational policies. The control entity 130 comprises a plurality of software modules which can be hosted on one or multiple different servers 122 of the cloud environment 120. For example, the control entity may comprise a real-time monitoring block being adapted to monitor the demand or provision of energy by the energy grid elements 150. In addition, the control entity may comprise a data transmission block being configured to realize and maintain the data transmission between the energy grid elements 150 and the control entity 130. Furthermore, a virtual network control block may be provided which is adapted to manage virtual energy grid networks comprising a plurality of energy grid elements 150. An aggregation control block of the control entity 130 may be adapted to form virtual energy grid networks by aggregating multiple energy grid elements 150. Furthermore, the control entity 130 may comprise some managing blocks, for example a topology managing block, a status managing block and switch managing block. The topology managing block may be adapted to manage topologies of several virtual energy grid networks, e.g. assign new energy grid elements 150 to existing virtual energy grid networks. The status manager block may monitor the status of energy grid elements 150 in order to provide actual status information of energy grid elements 150.

In addition, the control entity may comprise several blocks for handling IT-network purposes, for example, a topology link discovery block, a configuration block, and analytics block and a route computation block. Said blocks may handle the integration of the energy grid elements 150 into the IT-network, for example realize network connections, specifically VPN-network connections between the control entity 130 and the energy grid elements 150.

Furthermore, the control entity 130 may comprise a plurality of interfaces for exchanging information between the energy grid elements 150 and the control entity 130, respectively, between the control entity 130 and a virtual power plant (VPP). The coupling towards the energy grid elements 150 may be realized by an OpenFlow-protocol, an IEC 61850 protocol, an SNMP-protocol or NETCONF-protocol. The OpenFlow protocol supported by a OpenFlow client at the energy grid element 150 provides mainly modification operations of the forwarding tables. The IEC 61850 protocols supported by a 61850 client at the energy grid element 150 provide IEC 61850 specific configuration (SCL: substation configuration language) and operations towards I/O e.g. relay.

The control entity 130 may further comprise an interface for exchanging information with the virtual power plant (VPP). The said virtual power plant may be also formed by a plurality of software applications which are hosted in the cloud environment 120. The coupling between the control entity 130 and the virtual power plant may be realized by a programming language independent interface, for example a RESTful (Representational State Transfer) interface.

So, summing up, FIG. 4 sketches a SDN controller architecture comprising network oriented services (southbound interfaces) such as topology and route computation and energy grid element/VPP specific service components (northbound interfaces) such as real-time monitoring and aggregation control. The RESTful northbound interface provides a programming language independent service (application) interface to a potential VPP control-center. The VPP may be an aggregation of cloud-based smart energy apps.

In the following, a method how a DER may dynamically join or leave the VPP network without reconfiguring network elements based on the SDN approach is disclosed. Network elements and IEDs which belong to a DER require an initial registration to the controller. If a new DER should be attached to the existing VPP, unknown packets will arrive at the network elements of the VPP. According to the OpenFlow approach, the first unknown packet will be redirected to the controller. The new DER may be treated by the controller as a new VPP entity. 61850 semantics for both, services and data models will be extracted and conveyed by the IEC 61850 protocol and support the integration into the VPP. The 61850 client located at the IED may extract object definitions from the device using network connectivity using a standard message interface.

Moreover the aggregation control component may be triggered automatically performing integration of a newly joined DER towards the RESTful northbound interface of the controller. The new DER may also carry new network elements and IEDs into the VPP network, which need to register to the controller where the network topology discovery service will update the current VPP network topology towards the VPP control center. Furthermore, VPP aggregation constraints such as weather conditions resulting in modified energy production may trigger the relocation of the affected DER to a different VPP which may be supported by different network slices. This DER relocation process is again a dynamic aggregation of the corresponding network into a different SDN supported VPP.

Figure 5:
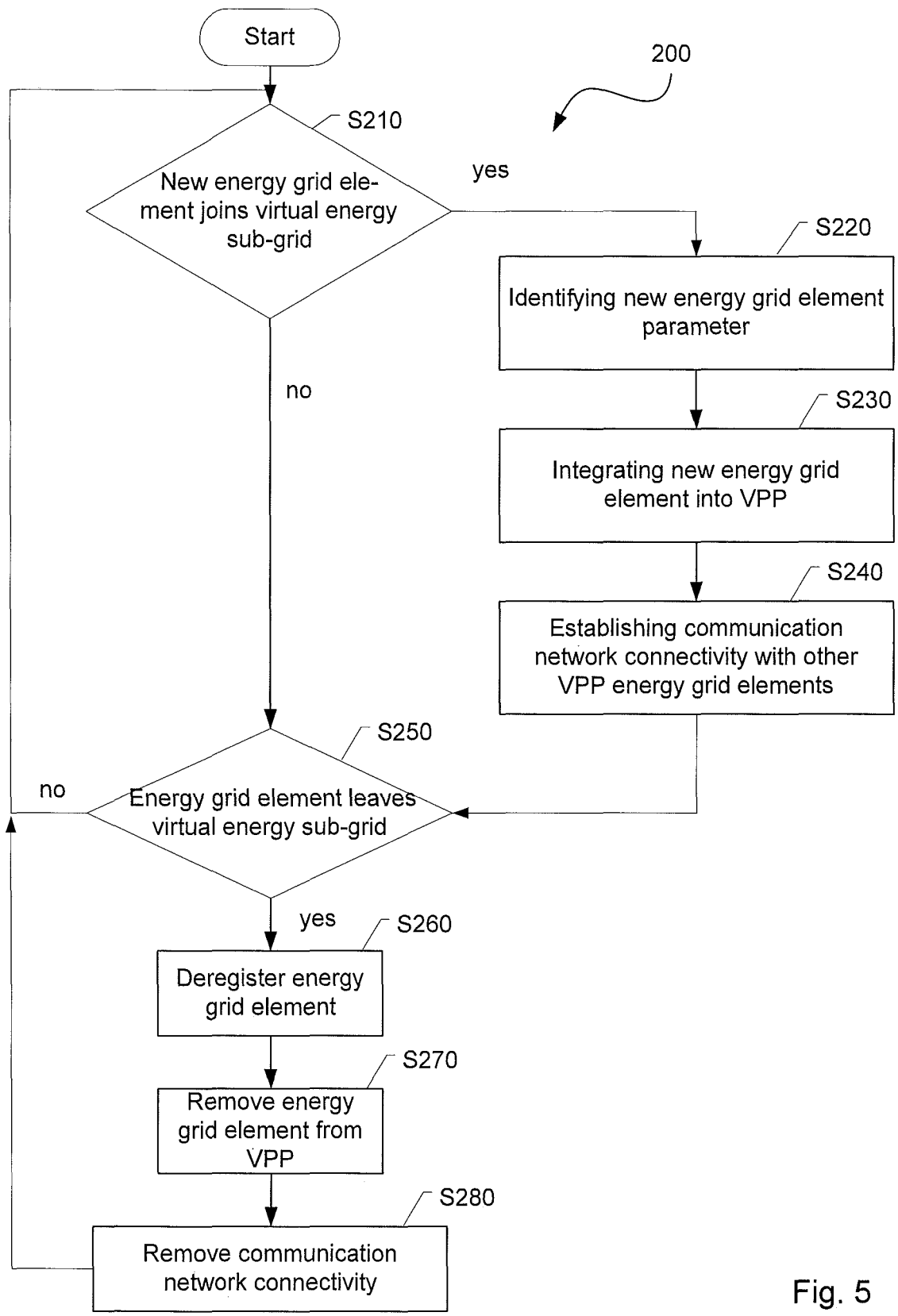
FIG. 5 illustrates an example schematic flowchart for dynamically including/removing a virtual energy sub-grid.

FIG. 5 illustrates a method 200 how an energy grid element 150 can dynamically join or leave a virtual energy grid network, respectively, a virtual power plant (VPP). An energy grid element 150 may comprise one or more network entities and/or integrated electronic devices (IEDs) which require an initial registration to the control entity 130. If a new energy grid element 150 should be attached to the existing VPP unknown packets will arrive at the control entity 130, respectively, the network elements of the VPP.

If an unknown packet arrives at the control entity 130 (S210), respectively, the network elements of the VPP, a join procedure may be initiated. According to the OpenFlow approach the first unknown packet will be redirected to the control entity 130. The new energy grid element 150 can be treated by the control entity 130 as a new VPP entity.

In order to join an existing VPP, relevant parameters of the energy grid element 150 may be identified (S220). For example, the control entity 130 may place a request for providing a set of parameters which are necessary to define the type of energy grid element, the current state, the location etc. 61850 semantics for both, services and data models will be extracted and conveyed by the IEC 61850 protocol and support the integration into the VPP. The 61850 client located at the new energy grid element 150 can extract object definitions from the device using network connectivity using a standard message interface. The 61850 protocol is based on TCP/IP but can also run on Ethernet directly for efficient transfer of high frequency monitoring samples. 61850-x-x protocol includes 61850-7-410 and 61850-7-420 etc.

Moreover, the new energy grid element 150 may be integrated into an existing VPP (S230). In other words, the new energy grid element 150 may be grouped with other energy grid elements 150 in order to form a virtual energy sub-grid controlled by a VPP. The aggregation control block of the control entity 130 may be triggered automatically performing the integration of the newly joined energy grid element 150 towards the RESTful interface of the control entity 130.

In addition, the network connectivity between the new energy grid element 150 and other components of the virtual energy sub-grid has to be realized (S240). The new energy grid element 150 may also carry new network elements and IEDs into the virtual energy sub-grid, respectively the VPP network which need to register to the control entity 130 where the network topology discovery service will update the current VPP network topology towards the VPP control center.

Similarly, the situation may arise when VPP aggregation constraints (e.g. weather conditions, changing energy production costs etc.) may require a relocation of an energy grid element 150 from a first virtual energy sub-grid to a second virtual energy sub-grid. If a relocation trigger is received (S250), the energy grid element 150 is deregistered (S260), removed from the VPP (S270) and the communication network connectivity is removed (S280). Afterwards, the leaving energy grid element 150 is handled as a new energy grid element 150 as described above for registering at a new VPP. This energy grid element 150 relocation process is again a dynamic aggregation of the corresponding network into a different VPP supported in the cloud environment 120.

Summing up, a system and method for providing energy services in a cloud environment has been disclosed. The proposed system/method is advantageous because a plurality of energy grid elements with different sizes, different locations and different energy specific properties can be orchestrated in an effective way.

It has been proposed to implement a wide area (regions, nation-wide) generalized access to all energy grid elements (power plants, energy storage systems, renewable sources, consumers, e-cars, etc.) by means of "Energy Grid Functions Virtualization" applying e.g. IEC61850 protocol based data models and solutions. (This is in analogy to the NFV (network function virtualization) approach in ICT (information and communication technology) networks, removing hardware dependency by virtualization and generalization).

Further, an intelligent control and management instance for the energy grid "Software Defined Energy Networking (SDEN)" will be used to provide flexible, real-time orchestration of energy grid resources to implement the various business models. A generalized API will be offered to various energy grid networking applications (e.g. load balancing, peak shaving, capacity trading, energy brokerage, emergency operation, etc.) thus forming an "Energy Cloud". (This is in analogy to the SDN approach in ICT networks for orchestrating ICT network resources). ICT cloud solutions, in particular "Carrier Clouds", can be exploited to implement the telecommunication infrastructure for the Energy Cloud to benefit from proven elasticity, scalability and efficiency features on the one hand, and implement specific reliability, availability, security and robustness features exploiting the basics of Carrier Clouds.

With this Cloud-based architecture, the SDN (Software Defined Network) part provides computing, storage and media resources to the users on the ICT side, and the SDEN part provides cost and $CO_2$ efficient energy to the players on the energy grid side. Since the related services and applications can use an equivalent or even identical cloud platform, we additionally enable novel approaches for a joint operation and optimization of both ICT and energy networks.

Thus, we could provide cost and CO2 efficient energy also to ICT consumers (e.g. to ICT network resources like routers, distributed network equipment or large centralized data centers) wherever and whenever they need it, and thus cope with their dynamic demands.

Conversely, the ICT network resources/energy consumers become aware of the energy availability offerings by the energy grid side and could use selectively those resources offering the most cost efficient energy (e.g. by directing the traffic flows following efficient routes, or by transferring processes and data to dedicated data centers depending on the local availability of cost efficient energy), and thus cope with the spatial and temporal availability of energy sources.

Furthermore, aggregation and control of energy grid elements is an attractive research topic. The SDN technology providing scalable and efficient networks constitute a communication platform for controlling energy grid elements comprising networked IEDs connected via communication network (e.g. Ethernet).

Network resources supporting energy grid elements communication can be allocated on-demand when energy grid elements (set of IEDs) join or leave a VPP dynamically. IEDs can be seen as a set of energy grid functions. A newly joined energy grid element can be dispatched to the virtual network of the suitable VPP. The network management complexity can be handled by software services based on SDN components (Apps). In this approach the SDN controller integrates communication network and the energy grid functions.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, the explicit use of the term "processor" or "computer" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random-access memory (RAM), and non-volatile storage. Other hardware, conventional and/or custom, may also be included.).

The invention claimed is:

1. A system for providing energy services in an energy grid using a cloud environment comprising a distributed server architecture for processing computational tasks and a plurality of storage entities for storing information, the system further comprising:
   at least one control entity adapted to receive information from at least one of a plurality of energy grid elements and to operate the at least one of the plurality of energy grid elements based on operational policies; and
   one or more control interfaces coupled with the at least one of the plurality of energy grid elements via standardized protocols that include both an OpenFlow protocol and an IEC 61850 protocol, the one or more control interfaces being adapted to transmit information provided by an energy grid element to a control entity and/or the one or more control interfaces being adapted to receive information from the at least one control entity to operate the energy grid element based on the information;
   wherein at least one server of the cloud environment is registered at the at least one control entity as an energy grid element, and wherein the at least one control entity is adapted to share information regarding hardware resource usage of the cloud environment with a controller of another network that uses the cloud environment to improve usage of available energy; and
   wherein the at least one control entity comprises a plurality of software modules which are hosted in the cloud environment and the operational policies are stored in storage entities of the cloud environment to operate the at least one of the plurality of energy grid elements according to the operational policies and the shared information.

2. The system according to claim 1, wherein the one or more control interfaces provide a generalized interface adapted to describe the functionality of an energy grid element based on a set of parameters.

3. The system according to claim 2, wherein the at least one of the plurality of energy grid elements are grouped according to energy grid element types and the set of parameters is chosen according to the energy grid element type to characterize specific properties of the type of energy grid elements.

4. The system according to claim 1, wherein the at least one control entity is adapted to receive properties and/or status information of the at least one of the plurality of energy grid elements to orchestrate the at least one of the plurality of energy grid elements according to one or more operational properties.

5. The system according to claim 4, wherein the operational policies include rules for controlling an energy input in or an energy output out of one or more energy grid elements.

6. The system according to claim 1, wherein the at least one control entity and the at least one of the plurality of energy grid elements are coupled via a communication network connection.

7. The system according to claim 6, wherein the at least one control entity comprises means for dynamically including an energy grid element into the communication network to enable a communication between the energy grid element and the at least one control entity.

8. The system according to claim 1, wherein the cloud environment provides a user interface, the user interface enabling a user to define a user-related operational policy to define the usage of resources of the energy grid in a customized way.

9. The system according to claim 8, wherein settings provided via the user interface are stored in user-related storage areas of the cloud environment.

10. The system according to claim 1, wherein the at least one control entity is adapted to dynamically aggregate multiple energy grid elements to build at least one virtual energy sub-grid within the energy grid.

11. The system according to claim 10, wherein the cloud environment is adapted to provide one or more virtual power plant applications to control at least one virtual energy sub-grid.

12. The system according to claim 10, wherein the at least one control entity is adapted to dynamically add an energy grid element to a virtual energy sub-grid and/or to remove the energy grid element from the virtual energy sub-grid.

13. The system according to claim 1, wherein the at least one control entity is coupled with a cloud environment control entity for an exchange of information.

14. The system according to claim 1, wherein a distribution of computational tasks within the cloud environment is controlled based on information provided by the at least one control entity.

15. The system according to claim 1, wherein the one or more control interfaces are coupled to the at least one control entity via an Ethernet link.

16. The system according to claim 1, wherein the at least one control entity is adapted to monitor a demand or a provision of energy by the at least one of the plurality of energy grid elements in real-time.

17. The system according to claim 1, wherein the plurality of energy grid elements comprises network entities and/or integrated electronic devices which require an initial registration to the at least one control entity.

18. The system according to claim 1, wherein the plurality of energy grid elements comprises one or more of: wind power plants, photovoltaic systems, fossil fuel power plants, factories, E-cars, battery packs or pumped storage power plants.

19. A method for providing energy services in an energy grid using a cloud environment comprising a distributed server architecture for processing computational tasks and a plurality of storage entities for storing information, wherein the energy grid comprises a plurality of energy grid elements, the plurality of energy grid elements being coupled with a control entity by means of one or more control interfaces, the method comprising the steps of:

instantiating at least one control entity comprising a plurality of software modules in the cloud environment by hosting the plurality of software modules on the distributed server architecture;

registering at least one server of the cloud environment at the at least one control entity as an energy grid element;

sharing information regarding hardware resource usage of the cloud environment between the at least one control entity and a controller of another network that uses the cloud environment to improve usage of available energy;

storing operational policies in storage entities of the cloud environment; and exchanging information between a control entity and energy grid elements via one or more control interfaces that utilize standardized protocols that include both an OpenFlow protocol and an IEC 61850 protocol to operate the energy grid elements according to the stored operational policies and the shared information.

20. A system for providing energy services in an energy grid using a cloud environment comprising a distributed server architecture for processing computational tasks and a plurality of storage entities for storing information, the system further comprising:

at least one control entity adapted to receive information from at least one of a plurality of energy grid elements and to operate the at least one of the plurality of energy grid elements based on operational policies, wherein the at least one control entity is adapted to share information regarding hardware resource usage of the cloud environment with a controller of another network that uses the cloud environment to improve usage of available energy; and one or more control interfaces coupled with the at least one of the plurality of energy grid elements via standardized protocols that include both an OpenFlow protocol and an IEC 61850 protocol, the one or more control interfaces being adapted to transmit information provided by an energy grid element to a control entity and/or the one or more control interfaces being adapted to receive information from the at least one control entity to operate the energy grid element based on the information;

wherein the at least one control entity comprises a plurality of software modules which are hosted in the cloud environment and the operational policies are stored in storage entities of the cloud environment to operate the at least one of the plurality of energy grid elements according to the operational policies and the shared information.

* * * * *